United States Patent
Fredriksson et al.

(10) Patent No.: US 8,065,052 B2
(45) Date of Patent: Nov. 22, 2011

(54) METHOD AND ARRANGEMENT FOR CORRELATING TIME BASES BETWEEN INTERCONNECTED UNITS

(75) Inventors: Lars-Berno Fredriksson, Kinna (SE); David Lindqvist, Gothenburg (SE)

(73) Assignee: Xinshu Management, L.L.C., Dover, DE (US)

( * ) Notice: Subject to any disclaimer, the term of this patent is extended or adjusted under 35 U.S.C. 154(b) by 1315 days.

(21) Appl. No.: 11/554,370

(22) Filed: Oct. 30, 2006

(65) Prior Publication Data
US 2007/0094528 A1    Apr. 26, 2007

Related U.S. Application Data

(63) Continuation of application No. PCT/SE2005/000581, filed on Apr. 21, 2005.

(30) Foreign Application Priority Data

Apr. 30, 2004  (SE) ...................................... 0401130

(51) Int. Cl.
  *H04L 7/06* (2006.01)
  *G06F 1/12* (2006.01)
  *H04L 7/00* (2006.01)
(52) U.S. Cl. .............. 701/36; 701/1; 713/400; 375/356; 375/364
(58) Field of Classification Search .................. 713/178, 713/502, 375, 400; 719/313; 709/248, 224; 701/1, 36; 370/517, 519, 235; 368/46, 53, 368/59, 60; 714/731, 775; 375/354, 359, 375/364

See application file for complete search history.

(56) References Cited

U.S. PATENT DOCUMENTS

| | | | |
|---|---|---|---|
| 4,815,110 A * | 3/1989 | Benson et al. | 375/356 |
| 5,392,421 A | 2/1995 | Lennartsson | |
| 5,402,394 A * | 3/1995 | Turski | 368/10 |
| 5,550,738 A * | 8/1996 | Bailey et al. | 455/456.5 |
| 5,564,285 A | 10/1996 | Jurewicz et al. | |
| 5,896,524 A | 4/1999 | Halstead, Jr. et al. | |
| 6,118,936 A | 9/2000 | Lauer et al. | |
| 6,535,926 B1 * | 3/2003 | Esker | 709/248 |
| 6,766,368 B1 | 7/2004 | Jakobson et al. | |

(Continued)

FOREIGN PATENT DOCUMENTS

EP      1191747 A2     3/2002

(Continued)

OTHER PUBLICATIONS

Roger Bou Faisal/OGU; EP Search Report dated Jun. 13, 2005.

(Continued)

*Primary Examiner* — Thomas Black
*Assistant Examiner* — Christine Behncke
(74) *Attorney, Agent, or Firm* — Brundidge & Stanger, P.C.

(57) ABSTRACT

A method and arrangement for correlating time in different time bases used by interconnected units by timestamping a reference event with a time determined with respect to a first time base. A message unit provides the time to a second interconnected unit that uses a second time base. A translation device is configured to calculate a difference between the time measured by the first time base and in the second time base. The difference is used to translate a time measured by the first clock to a time in a different time base at run time.

46 Claims, 7 Drawing Sheets

U.S. PATENT DOCUMENTS

| | | | |
|---|---|---|---|
| 6,941,557 B1 | 9/2005 | Jakobson et al. | |
| 7,010,359 B2 * | 3/2006 | Faulhammer et al. | 700/3 |
| 7,139,938 B2 | 11/2006 | Marwaha | |
| 7,464,154 B2 | 12/2008 | Dick et al. | |
| 7,483,448 B2 * | 1/2009 | Bhandari et al. | 370/503 |
| 7,496,686 B2 * | 2/2009 | Coyle | 709/248 |
| 7,711,880 B2 * | 5/2010 | Fredriksson | 710/117 |
| 2004/0023678 A1 * | 2/2004 | Fredriksson | 455/502 |
| 2004/0059807 A1 | 3/2004 | Klotz et al. | |
| 2006/0069939 A1 | 3/2006 | Fredrikkson | |
| 2006/0083265 A1 * | 4/2006 | Jordan et al. | 370/503 |
| 2006/0109376 A1 * | 5/2006 | Chaffee et al. | 348/423.1 |
| 2006/0156065 A1 * | 7/2006 | Glass | 714/18 |
| 2009/0077287 A1 * | 3/2009 | Weigl et al. | 710/100 |
| 2010/0076604 A1 * | 3/2010 | Johnson et al. | 700/275 |

FOREIGN PATENT DOCUMENTS

| | | |
|---|---|---|
| WO | WO-03/058468 A1 | 7/2003 |
| WO | WO-2004015945 A1 | 2/2004 |

OTHER PUBLICATIONS

Written opinion of the international searching authority from PCT/SE2005/000581 dated Jul. 4, 2005.

Response to Final Office Action (EFS filed Apr. 2, 2010) for U.S. Appl. No. 11/184,821.

European Search Report by M. Milano dated May 10, 2006 for EP 05 44 5061.

Response to Non-Final Office Action (EFS filed Aug. 6, 2010) for U.S. Appl. No. 11/184,821.

European Patent Office Communication for 05738131.1-2416, dated Oct. 18, 2010.

* cited by examiner

METHOD AND ARRANGEMENT FOR CORRELATING TIME BASES BETWEEN INTERCONNECTED UNITS

CROSS REFERENCE TO RELATED APPLICATIONS

This application is a continuation under 35 U.S.C. §120 of International Application PCT/SE2005/000581 filed on Apr. 21, 2005. International Application PCT/SE2005/000581 claims priority to Swedish Application 0401130-0 filed on Apr. 30, 2004. The entire contents of each of these applications are incorporated herein by reference.

BACKGROUND

The present disclosure relates to a fixed and/or moveable system, in particular in or for vehicles, for example cars. The system operates with common or related time bases for indication of the time of detected or generated events in the system, and/or in a system or systems connected to this.

The present disclosure also relates to a device for effecting the establishment of functions carried out by two or more units (nodes) comprised in the system in a fixed and/or moveable system, in particular in or for vehicles, for example cars. The device can relate to arrangements for detection, control, analysis and/or simulation of comprised units.

The use of systems of this type in, for example, vehicles, is already known and reference can accordingly be made, among other things, to the patent applications and patents submitted by and granted to the same applicant as the present applicant. In the respective systems, the message and information (data) transmissions are carried out using or in accordance with protocols of a known type, which can be of a standardized type, for example Universal Serial Bus (USB), Controller Area Network (CAN), Local Interconnect Network (LIN), Ethernet, IEEE 802.11x, Infrared (IR), Wireless USB (WUSB), etc.

With this type of system, there are problems in determining events and/or time functions without relatively complicated and bandwidth-intensive arrangements. There is, for example, a desire to be able to determine the occurrence of the events and/or give indications of the time so that the normal traffic can be utilized to indicate the relevant time and/or occurrence of the event, for example, without extra hardware needing to be involved. The object of the disclosure is, among other things, to solve this problem. There is a need, in the respective module units, to be able to operate with preferably small resources with the object of simplifying the construction of the units. There should also be great freedom of choice in the construction of systems and their relationships. This disclosure also solves this problem.

A major problem in distributed embedded control system is to synchronize the generation of events in different nodes to each other in a timely manner, e.g., reading sensor values, execution of movements, releasing of power etc. The main solution to this problem is to create a global time and synchronize clocks at each node. Usually the time synchronization is made at the communication level. Typical examples are TTCAN, TTP and FlexRay protocols in the vehicle industry and SERCOS in the factory automation industry. All of these communication protocols are time triggered and it is a common opinion that safety critical distributed embedded control systems have to be based on a time triggered communication. An alternative to synchronizing clocks is to have each module relying on its own local clock and have a time translator recalculating the time of each clock to a common global time, but it has been regarded impossible to do in real time.

U.S. Pat. No. 5,896,524 suggests a method to recalculate clock readings by associating event pairs related to each other. However, such conventional methods cannot be used in realtime (e.g., see column 1, line 65 through column 2, line 4). What is needed is a method and apparatus that calculates the relationship between local clocks at run time. What is further needed is to calculate the relationship between local clocks and a global time base at run time.

U.S. Patent Application Publication US2006-0143345A1 shows that, in realtime systems at run time, it is more efficient to use different time domains within the system, wherein each time domain is created according to the need of cooperating nodes, rather than to rely on a global time. However, a global time may be better used for analyzing a system.

Each system in which the disclosure can be used can be regarded as individual, one or more series or sequences of events that are related to each other in time and space. There can be different time descriptions and time frames within one and the same system. Smaller systems can be comprised in the system, which in turn can, now or later, be comprised in other systems. During the first stage, the "drawing board" stage, of a system development, it is expedient to relate all the events to one and the same time frame, for example related to the physically defined second. The degree of coordination that is required of the different events in order for the required system function to be achieved can be analyzed in a first stage. In a second stage, an analysis of the relationship of the individual events to each other can indicate that other time frames and the utilization of knowledge concerning the association of different events to each other can simplify the design of the final system and the description, verification and validation of the same. The disclosure simplifies these development processes.

For analysis or verification of systems, there is a need not only to timestamp events that have occurred, but also to know with what precision and/or accuracy the timestamping is carried out.

It can happen in systems that different parts of the system relate events to different time bases, which in turn are related to each other.

Analysis and monitoring instruments of different types for vehicles are often based on standard computers with operating systems, for example a personal computer (PC) with WINDOWS XP®. The operating system (OS) simplifies the development of the software at the price of precision of timestamping of external events. Therefore special units are introduced between the PC and the bus system that, among other things, comprise a clock for timestamping of incoming time messages. For example, with the utilization of the program CANANALYZER from the company VECTOR, a CANCARDXL from the same company is connected to the PC. The CANCARDXL has a local clock and can timestamp messages from two CAN busses. If there is a need for several CAN busses, an additional CANCARDXL unit must be connected to the PC and the two CANCARDXL units must be connected to a coordination unit via a coaxial cable arrangement in order to synchronize their local clocks to a common time. By utilizing the disclosure, timestamping can be carried out with great precision, utilizing only components to be found as standard in the PC.

SUMMARY

This disclosure addresses time synchronization in distributed embedded control systems by selecting specific events and their relation to the local time at different nodes ahead of time to be identified as reference events. A time translator can then filter out messages with time stamps related to the reference events, and a respective transmitting node within the system. By defining the relationship between a reference event, time-stamped according to a first clock at a first node, and the time relation of the reference event to a second clock, the time translator can recalculate the first time to the second time and vice versa at run time, i.e., in real time.

In addition, a reference event can generate several secondary events. By defining the relationship between such a reference event, its secondary events, the time stamping of these events, and how these time stamps are transmitted to a time translator, a time translator can be programmed to recalculate the time at one time domain to the time at another time domain at run time An occurrence of the execution of a function can be arranged to be able to be detected and determined by means of one or more devices that perceive time, for example clocks, and/or devices that indicate events, which devices are comprised in one or more of the units that constitute or form module units in the system. The system can thereby include one or more serial, distributed and protocol-utilizing systems. The respective determination is to be arranged to form the basis of or invoke functionality in the system and/or in monitoring, analysing, verifying, completely or partially simulating or stimulating devices in the system.

A consequence of the concept of the disclosure is that the same or different events that are perceived or generated by different modules in the same or different systems can be time related in a simple way. The modules that are affected by the time relating can perceive certain events at the same time, or alternatively certain different events for which the time relationship is known. Such events belong to the group "reference events". The modules can be arranged to generate or detect reference events, display local clock function, be able to read off local time upon the detection or generation of a reference event and provide time information on the basis of the value that was read off being sent to one or more translation units. The translation unit(s) then utilize these values in order to create a common time reference for the modules and events concerned, with the result that it is possible to create time indications that are comparable. The translation unit can be considered to create a common time domain for relating events. Comparisons can be carried out in different time domains that can be created by different translation units, which can utilize common reference events. In an embodiment, the bit pattern in a communication protocol is utilized as reference event. For example, the Start Of Frame bit (SOF) in CAN is suitable. More specifically, the sampling point in the bit can be used, as certain CAN controllers, for example MCP 2515 from MICROCHIP (Microchip Technology, Inc., 2355 West Chandler Boulevard, Chandler, Ariz., USA, 85224-6199), generate a signal for this that can be used in order to trigger the requisite electronics for the reading off of local time for the occurrence of the event.

Further developments of the concept of the disclosure are apparent from the following.

For example, the system operates with event functions and accordingly reference events can be utilized which can be related to one or more reference event generators. A reference event can be sent from a common point and can refer to a common group. The reference events can occur at particular intervals and can themselves define the clock function compare with a Phase Locked Loop). The reference event detectors must be able to be placed in the units and accordingly a detector can be placed in each unit. An interrupt generated by a selected protocol's communication circuit can be utilized as a detector. The respective detector can be set up by defining or implementing how it is to be obtained (for example, by connecting to a suitable layer in the protocol stack and searching there for a special packet/bit pattern/edge). Events must be able to be related by group, for example with regard to sequence or time. The group can work with a common starting point. Thus, for example, a unit can communicate directly with all units in the group or at least send messages that all the other units can detect. The messages can represent typical events. The respective message can, for example, include packets according to any serial communication standard, for example the protocols mentioned in the introduction. The reference event can consist wholly or partially of a message. The USB protocol's Start-of-Frame (SOF) packet can advantageously be selected as reference event. This packet is transmitted in the normal way and has a sequence number, which facilitates the correct association of timestamp to reference event. USB packets propagate in a USB system in a defined way and a USB host can be regarded as a reference event generator in its own time domain, distinct from other time domains, for example the domain in which a WINDOWS application operates, in the same PC as the USB host. The reference events can be transmitted to all units that are comprised in the same USB arrangement, that is all units can listen to the same event, for example, at the same time. The phrase "at the same time" here means a maximum of 50-100 ns jitter in the detection for all the units plus up to a couple of hundred ns constant delays. A USB Hi-speed maximal delay can be 26 ns in the cable, 4 ns in the "hub trace", 36 hs-bits in the hub electronics in a maximum of 5 levels plus 30 ns for connecting in last unit, totaling 530 ns. A Hi-speed jitter due to the USB protocol can be a maximum of 5 hs-bits per hub and a maximum of 5 hubs can be connected, which gives a maximal uncertainty of 25 hs-bits, which corresponds to approximately 50 ns time inaccuracy for the propagation of an SOF through a USB connection. A "hs-bit" is here considered to be the duration of a hi-speed USB bit time i.e. 1/(480 MHz), or approximately 2 ns.

In the embodiments, each unit can comprise a local clock which is able to be read by or in the application in question. Timestamping can be carried out of each reference event and the timestamping is carried out preferably with externally triggered capture register. Correct association of the timestamp with the reference event can be ensured. The timestamps can form the basis for relating clocks, time and events. The clocks or the read-off time must be able to be related. In addition, in an embodiment, a time master can be included, whose time is, if required, to be regarded as global (in groups). In order to create a transitive relationship, that is even if two different units cannot directly relate their time to each other, this can still be achieved if both can relate their times to a utilized master or intermediate unit. The time master can, in turn, be synchronized or related to a second reference, for example GPS. This gives the system access to a correct physical second that can be used for physical calculations, for example engine speed, power, accelerations, etc. The location of the time master can be in a common point in the system concerned, can be separate or can have another role in another unit. The role or the function can be changed. In an embodiment, the system does not need to utilize any master unit, but instead the translation takes place in an all-to-all function. In addition, it should be pointed out that a time master does not need to have its own physical clock, but instead can construct a virtual clock function by utilizing timestamps of reference events carried out by and messages from modules with their own time domains, that are connected to the system. With knowledge of the relationships of the reference events and respective time domains to each other, the time master can transform the time information to a time domain of its own and give respective time information referring to its own time domain to other units within or outside the system.

An important part for an efficient utilization of the disclosure is the actual development process for the device. In a first stage, the events are identified that are to be generated and detected and their relationships to a common notional time base relating to times and a permitted range around these, in order for the device to have the required functionality. In a second stage, events are identified that can constitute reference points between different units, in order for these to be able to detect, initiate or generate other events within the required time range, relative or absolute. In a third stage, functions are implemented in an actual design in order to achieve the required functionality. It should be pointed out that reference events are defined at system level and that these do not need to be known at module level. A basic idea in the disclosure is the concept of time. Each interaction between given event patterns can be regarded as having its own time domain, that is the time frame is based on its own time tick generator (which can be linear or non-linear) and the time indication is given as the number of ticks, whole plus if required parts thereof, according to a linear or circular model. The different time domains can be transformed from and to each other. Domains with circular model will appear as a cyclic course of events and those with a linear restricted model as discrete intervals in a linear unrestricted model. For general analysis tools, it is expedient to utilize a linear unrestricted model with the physical second as time tick. Another basic idea in the disclosure is the concept of a system. According to the disclosure, the system is regarded as a number of event functions that are coordinated by a controlling unit, the sum of all the event functions. These functions can be of two types, event-generating or event-detecting. The coordination takes place in time and space. A part of the coordination is carried out mechanically, and a part is carried out through the exchange of information between electronic units, of which a part of the latter is carried out via serial communication, for example of the CAN or USB type, directly or in combination. The system S is described with the number n of subsidiary functions F as:

$$S = \sum_{1}^{n} F_i,$$

where $F_i$ is the sum of the number m of events h, that is $$F_i = \sum_{1}^{m} h_j$$

In the first stage, the system in one or a few time domains is described, which system is well suited for describing and calculating its characteristics, for example the time domain T. This can be represented symbolically by:

$$S(T) = \sum_{1}^{n} F_i(T)$$

$$F_i(T) = \sum_{1}^{m} h_j(T)$$

In the second stage, a number of events are identified that are mutually interconnected between functions of interest and which are suitable for providing a time domain for the functions. These events are designated reference events. It is often expedient to have non-linear time ticks in time domains for event functions that are mechanically connected. In addition, reference events are identified that are connected in chains, that can be described mathematically, to different time domains. Starting from a generated event in a time domain, the detection of which generates a further event (in the same or another time domain), which in turn is detected in another time domain, during the development work a mathematical transfer function can be created between two time domains similar to a transformation of one coordinate system to another. Such transfer functions are implemented as required in the system's different units. The system can be described symbolically as follows:

$$S = \Sigma F_i(T_j, T_k, \ldots)$$

$T_1 = \forall T_m$, where $\forall$ is a transfer/reproduction operator between the time domains 1 and m.

In an additional embodiment, one or more time coordinators can be utilized. These can delegate any role as time master and receive and send timestamps of reference events. In this connection, the transmission can be carried out to any translation units in order for these to be able to calculate and translate the time in question. In an additional embodiment, certain units carry out the actual translation function in question. The time coordinates can receive and send other timestamps to any translation units. In an embodiment of the disclosure, the time coordinator is arranged in a common point in the system in question. The disclosure also takes into account the need for time translators to be included. Time translators handle the translation of time for the units that do not carry out the translation themselves.

A time translator can be located anywhere in the system, but a location in a common point is advantageous from the point of view of efficiency. A time translator can carry out translation from one unit to another via a selected reference time or alternatively according to the all-to-all principle, that is directly from each unit to every other unit. In this connection, a logical translation matrix can be utilized. A matrix that can keep track of how translation is to be carried out rapidly from all-to-all can, however, assume large dimensions and require substantial resources to keep updated (the complexity scales quadratically), but gives as a result faster translations. It is also possible to carry out the time translation just by keeping the reference timestamps updated, but this results in more work per translation. The translation unit can keep statistics of how well the clocks are related and can send the measurement value together with this information as a parameter. The inaccuracy can be calculated and sent with each measurement value. The translation function can be carried out with greater accuracy afterwards, that is when an additional reference message has been exchanged.

In connection with this, the derivative for the current period can, for example, be used instead of assuming that the same derivative applies as in the preceding period. Expressed in more general terms, interpolation is used instead of extrapolation for indication of a value. This is of particularly great significance for analysis and verification of a system's function. In short, it can be said that each unit/module that has been given access to the occurrence of reference events in different time domains can be arranged to carry out translation between the time domains, irrespective of whether the units/modules themselves are comprised in or represent any of the domains or not. In order that no ambivalences shall arise concerning the time domain to which a particular indication belongs, protocols should be set up which, for example, state who translates what and to what extent a unit's incoming/outgoing indications are to be considered to belong to the time domain of the transmitting and/or receiving unit.

The further developments can comprise the system's units being physically synchronized to their local clocks in accordance with some master time. This in itself increases and complicates the hardware in the units, which in such a case must perhaps still be supported by software resources. All clock operation can be carried out proactively, that is once the clock is to be used, it already shows the time in the master's time domain and it has only to read this off, which can reduce the unit's response time and in this way justify the greater complexity. The respective unit can itself calculate how it is to regulate its clock using the master's timestamps of the reference events. The respective unit can let the coordinator or translation unit calculate how the regulation and offset compensation are to be carried out by sending their timestamps of the reference events to the same and then awaiting a response.

The units can translate their time to another time before the time in question is transmitted. This does not need to require any extra hardware, but instead can comprise some software resources, depending upon how the translation is to be carried out. The translation work is carried out between production and consumption of the value. The unit can itself calculate how the translation is to be carried out using the master's timestamps of the reference events. The unit can let the coordinator/translator calculate how the translation is to be carried out by sending its timestamps of reference events to the same and then awaiting a response. The units need not be aware of another time than their own as far as the time relationship is concerned. It is sufficient for the units to send their respective timestamps of reference events to the coordinator. This requires relatively little resource in the units. The translator is responsible for all translation/time relating. The translator is arranged with compute power appropriate for the translation method.

Depending upon what precision is required for the detection of a reference event within a system, a group of individual events can be regarded as one and the same reference event. For example, SOF in CAN messages can be utilized as a reference event. A practical way of detecting SOF in CAN is to utilize the sampling point in the CAN controller. As the detection of SOF in the respective node is dependent upon the setting of the sampling point (which can be different in different nodes) and the nodes' distance to the transmitting module, the time of the detection will vary depending upon which node is transmitting and the setting of the receiving module. If SOF of any message is used as a reference event, in practice it is a group of events that is utilized.

The precision of the reference event is obviously not sufficient to measure, for example, the delay between different messages from different nodes. This is possible if instead individual CAN messages are selected as reference events (if SOF is to constitute a reference point, the message may not, except in certain special circumstances, have won the bit arbitration from a message with lower priority). More precisely, it can be the occurrence of specific edges/bits in the different nodes that gives the ability to determine delays between units, and the fact that these edges/bits have been propagated in both directions relative to the delay that is to be determined. Consequently, specific edges/bits that have been propagated through the system as undisturbed as possible are suitably selected for determining delays. An edge/bit that very probably originates from only one transmitting unit can be one following the arbitration field in a CAN message (however, suitably not the ACK bit, that is transmitted by receiving units).

At the system level, it is known which CAN messages the respective nodes transmit. By each of the transmitting and receiving modules timestamping one and the same message, and messages being sent in both directions through the system, the delays between respective modules can be measured and calculated to a common time domain.

In one embodiment, a unit, for example any such unit, can act as time master (with or without its knowledge). The units can work with a translation function for each time that is to be translated/related to the master time. The translation work is carried out between production and consumption of the value. This can result in a delay of possible consumption of the same.

The translation function can be carried out by the offset between the first and second times being added to the time that is to be translated. With this method, little compute power is needed for the respective translation. Synchronization/time relating is preferably carried out frequently with this method in order to minimize the effect of the respective clock's drift in relation to the other clocks. The translation can also be achieved by both offset and fixed frequency error compensation (drift compensation). The translation $A_x$ to $B_x$ (new and old refer to reference timestamps) can be carried out as follows:

$$B_x = B_{new} + (B_{new} - B_{old}) * (A_x - A_{new})/(A_{new} - A_{old}).$$

Given a computer with limited resolution and/or calculation accuracy and given that the times A and B are already scaled to be approximately equal (the derivative between them is approximately one), the following method can give a better result:

$$B_x = B_{new} - (A_x - A_{new}) + (((B_{new} - A_{new}) - (B_{old} - A_{old})) * (A_x - A_{new}))/(A_{new} - A_{old}).$$

Viewed analytically, the two methods are equivalent and are based on linear regression. As the calculation is carried out using a computer, discrete values must be used which results in limited possibilities for representation which has the result that the sequence is important. Irrespective of the method, care must be taken that the calculation does not overflow or get truncated in an undesirable way. The latter method can be a way to make this easier.

There can thus be great computing power per translation but, in return, the time relating does not need to be carried out as often in order to attain the same precision. The constant frequency error can be determined offline or the frequency error can be measured online. There can also be cable delays of a not inconsiderable size, which must then be included in the calculation. In one embodiment, negligible cable delays are selected. In the offline case, offset and/or frequency deviation can be measured once and for all and appropriate constant values can be calculated and inserted in the translation function.

In one embodiment, where delays can be measured online, units can be arranged so that reference function executions propagate through the communication medium in both directions relative to the units whose delay is to be measured, during which the two units determine the occurrence of the reference function executions relative to some time. These determined occurrences can be used to determine the delay.

The translator can save information in the respective unit about how the clock behaved during the most recent session in order to be able to phase in the unit in the next function stage more quickly and/or make the synchronization/time relating easier for the translator.

The more of the abovementioned resources, methods and/or functions that can be made dedicated, the more easily predicted and/or easily used and hence perhaps also more reliable is the utilization of clocks, time, time synchronization and/or time relating in the system.

The system described can advantageously be used on a vehicle, for example a car, lorry, tractor, scooter, boat, ship, airplane, etc. For the direct control system in a car, it is advantageous to have time domains with varying time tick in order to coordinate movements that are associated with the mechanical function of the driveline. As each so-called ECU (Electronic Control Unit) comprises a CPU that is controlled by an oscillating circuit that is independent of the movement of the mechanics, an ECU has at least two time domains with associated transformation operator. One and the same ECU can interact with several other ECUs that form groups working in a time domain common to the respective group.

The whole system in a car (vehicle) can have a linear finite time domain, which, for example, starts with the ignition key's "on" position and which ends with the ignition key's "off" position. In this time domain, the system behaves in a way expedient for driving the vehicle. When the ignition key is in the "off" position, the system operates in a different time domain, for example a circular time where information is obtained from some operating module that periodically listens for commands from a wireless signal for opening or locking of the car's doors and/or control of alarm functions. The car can be comprised in other systems connected with traffic control, traffic monitoring, law-enforcement monitoring, etc., which make completely different demands, but which now and then interact with the car's direct control systems.

Here, other time domains can be better suited, for example a time domain where the time tick varies with the location of the car. In a monitoring system, a need to update the car's location can be lower when it is in the country in normal circumstances than within built-up areas or in the vicinity of an accident. This frees bandwidth requirements in both the car's control system and the monitoring system. The present disclosure has a great advantage in that the development of systems that are to be incorporated in larger systems at a later date can be carried out without advance planning. When the systems are to be incorporated, the respective systems' event-generating and event-detecting functions are reviewed. As the respective systems have many such functions, there is a great probability that events will be found that can be utilized as reference events for the coordination of the systems that is required in order to obtain the required result. If suitable events can not be detected during the coordination analysis, expedient or suitable event-generating or event-detecting functions can be created and introduced into any one or both systems.

BRIEF DESCRIPTION OF THE DRAWINGS

A currently proposed embodiment of a device that has the significant characteristics of the disclosure will be described below with reference to the attached drawings in which.

DETAILED DESCRIPTION

Figure 1:
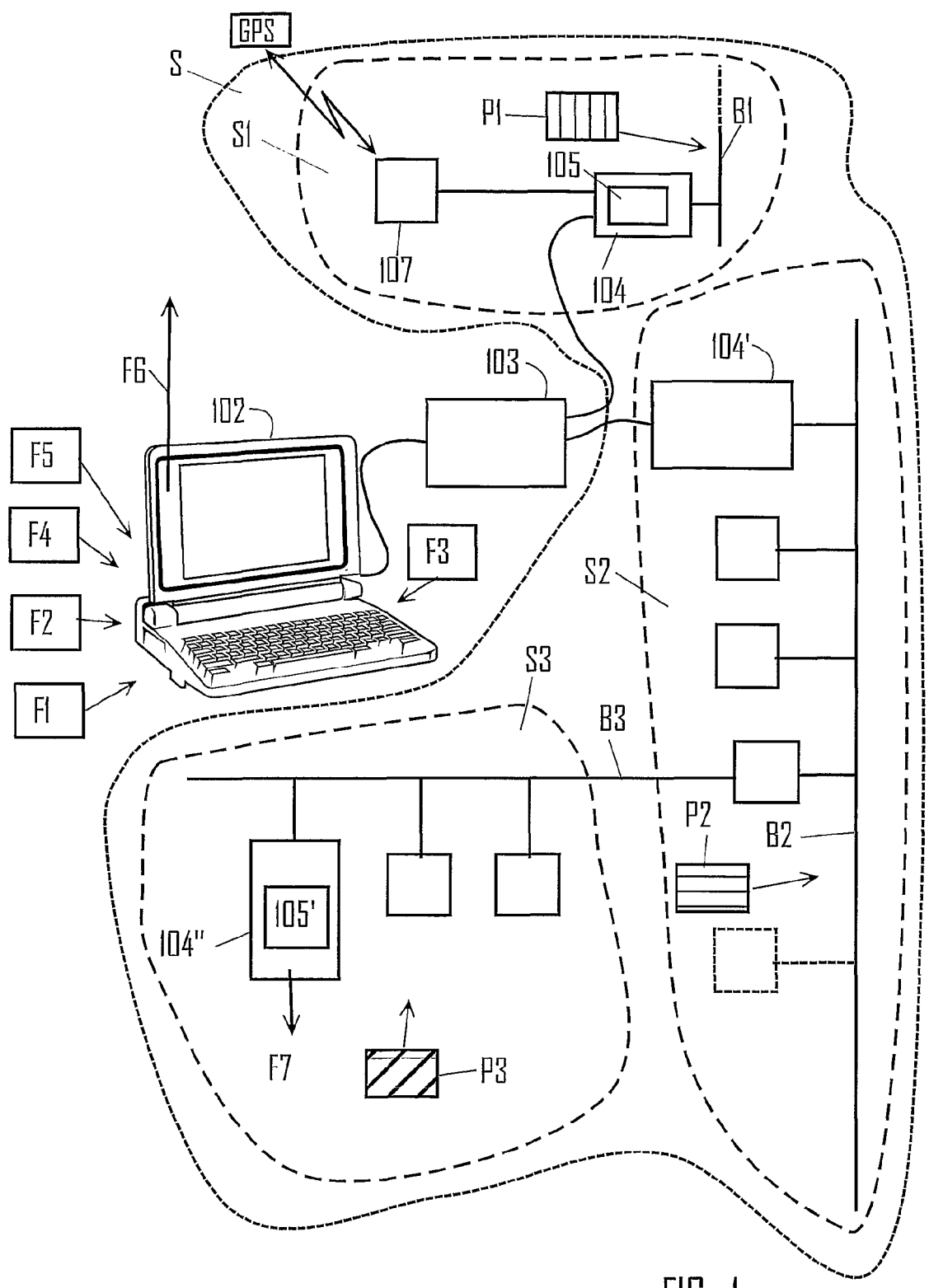
FIG. 1 shows a schematic illustration at system level of how various comprised module units and systems are logically interconnected.

In FIG. 1, three different systems are symbolized by S1, S2 and S3 interconnected to a system S. The systems can be of the types described in the introduction, for example USB, CAN, Bluetooth, etc. The serial bus connections in the systems are indicated by B1, B2 and B3. The systems work with protocols P1, P2 and P3 associated with the standards. In the systems there are one or more first units 104, 104', 104". In accordance with the disclosure, function events or function executions in the systems are to be related with regard to some type of time, for example linear time, circular time, virtual time, etc. The empty boxes in FIG. 1 illustrate other modules connected to their respective bus and which could each contain a microcontroller and related clock used, for example, to read sensor values, control mechanical actuators, or to control electrical devices.

The systems work with a number of functions. Any first function is indicated by F1 and relates to one or more reference times or master times to which the first units can relate. The times in question can be, for example, real and/or virtual. The time that any clock function 352, 410, 457 (not indicated in FIG. 1) represents can constitute an example of a real time, which can be with or without the knowledge of the unit. An example of a virtual time is an average time extrapolated from suitable units' time.

The systems can also comprise one or more second functions F2 that represent translation functions between different times in the system. Depending upon the characteristics of the times, a suitable method is selected for determining the translation functions. If, for example, two times both represent linear/modular times with tick of the same size, linear regression of the type is advantageously used.

A third function is indicated by F3 and is arranged to generate/represent the reference function execution that can at least be detected by the units that must be able to be related directly. This function can either be arranged in one or more dedicated new units and/or in any one or more existing units. As a proposal, suitable existing function executions in the system are identified and arranged to carry out the function. Examples of such suitable existing function executions in a USB system are SOF packets, which, in addition, are provided with sequence numbers which make easier the correct identification of specific packets. A proposed existing function execution in a CAN system that could be suitable for the disclosure is the SOF bit or suitable edge/bit inside a message and then preferably an edge/bit that occurs after the identification field, but before the ACK bit. In the case when an edge/bit within the data field constitutes F3, the transmitting unit's Time Reference (Tref) should, in addition, be able to be sent as data in the same packet in order to save time and bandwidth. In order to make the system more stable, an edge/bit in a message should not be accepted for reference function execution before the whole message has been validated.

The first function F1 can, in principle, be arranged to be in any of the units, with or without their knowledge. The second function F2 must, however, know which unit or units represent the first function F1, assuming that F2 wants to utilize F1 in question. The second function F2 can be arranged in one or more of the units. In this case, the units can be arranged to carry out translations from or to their own times. Alternatively, a unit in question can let any other unit carry out the translation in question. The first function F1 can, in turn, be synchronized with or related to another time, for example UTC and the physical second via GPS, 107. Protocols can be established for how times are to be interpreted and/or translated. If, for example, a group of units is arranged to be able to translate times between themselves, incoming times are selected, for example, that are already translated, while times that are to be sent are first translated to the receiving unit's time or vice versa. Alternatively, as described, F1 can be utilized in the form of both incoming and outgoing times being interpreted as or translated to the first function F1.

Figure 2:
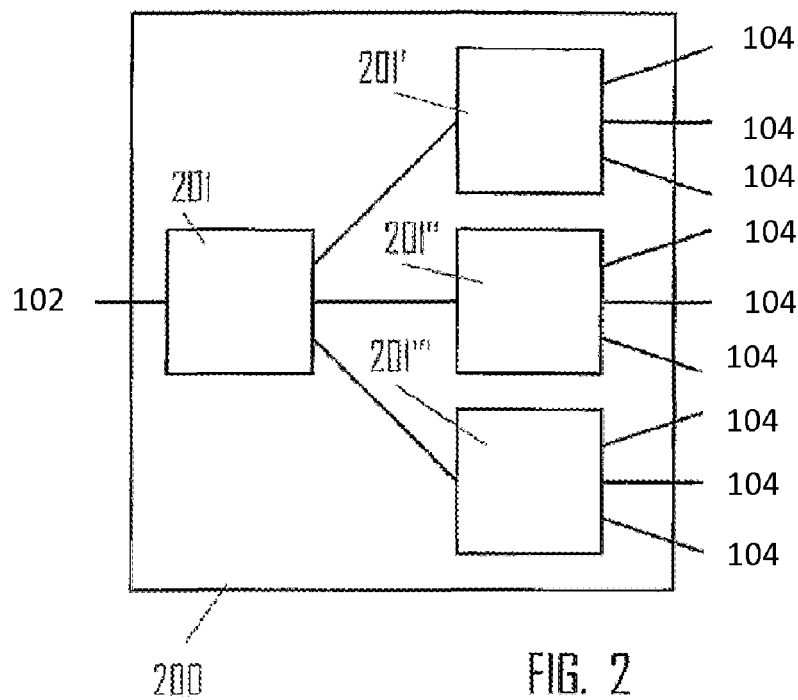
FIG. 2 shows in detail a unit 103 comprised in FIG. 1.

In one embodiment, a second unit 102 can advantageously be arranged with the first function F1, the second function F2, the third function F3, the fourth function F4, the fifth function F5 and/or a subunit 105. Such an arrangement is particularly advantageous if the protocol P2 consists of USB. In this case, unit 103 should be able to correspond to a unit 200, as shown in FIG. 2, which contains one or more units 201, where 201 can be internal and/or external USB hubs and/or units such as unit 450 in FIG. 4. In one embodiment, the second function may include use of a centralized translator, which means that the first units should be able to be implemented relatively easily. A decentralization of the translation function, on the other hand, causes a somewhat higher complexity of the first units, but in return the bandwidth can perhaps be lower and fewer units can be utilized in the system, while at the same time the reliability can increase as the resources are dispersed and accordingly no "single point of failure" needs to be introduced.

Figure 3:
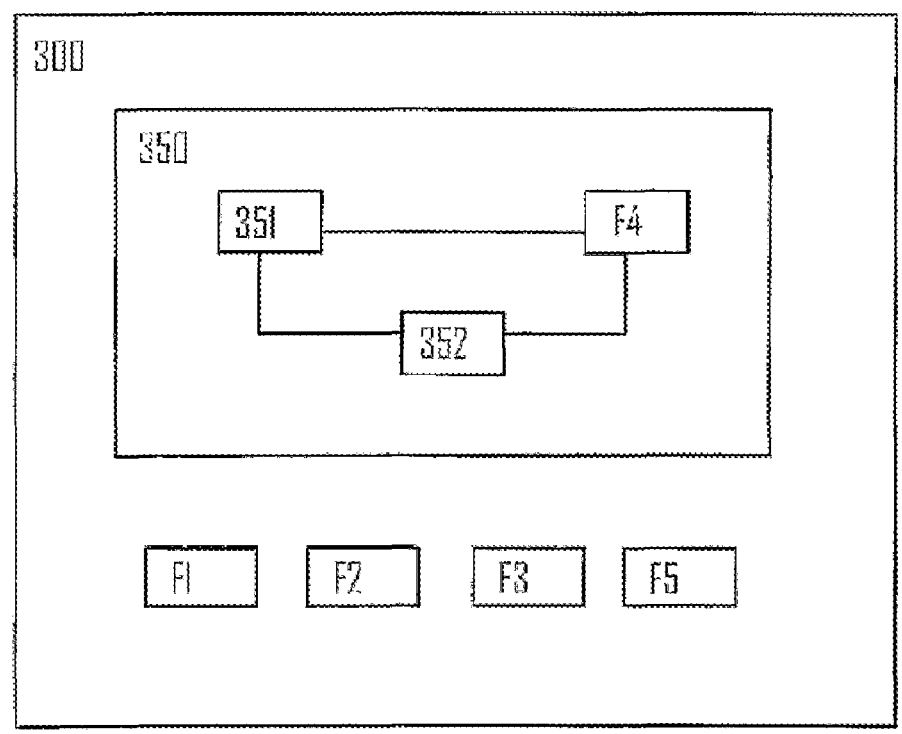
FIG. 3 shows a simple schematic illustration of a subunit 105 or 350 shown in FIG. 1.

FIG. 3 also shows a fourth function F4 that detects the function execution that the third function F3 generates. The first units 104 in FIG. 1 are arranged with one or more subunits 105. FIG. 3 shows a simple schematic drawing of unit 104 where unit 300 corresponds to 104 and unit 350 corresponds to 105. The subunits 350 comprise one or more time-perceiving devices 352, function execution detectors F4, and subunits or capture registers 351 arranged to store times. In the event of an actual detection, the clock 352 is read off and saved in a subunit 351 that saves the reference times in question, here designated Tref. The latter timestamping or reading off can be transmitted to units carrying out the second function F2, which for this purpose are arranged to determine how the translation in question is to be carried out. If the second function F2 is a part of the unit itself, one or more Trefs are awaited from other unit or units, which can be used for determining how translation to/from this and/or other units is to be arranged to be carried out. Alternatively, a unit's incoming Trefs can be selected in order to synchronize the local clock to, for example, any F1 on the basis of one or more timestamp(s). The Tref values can be considered to form the basis for relating all time in the systems. This applies irrespective of whether it is a question of translating time locally, synchronizing the time in question locally, or leaving the translation to some other unit. As shown in FIG. 3, any of the functions/roles can be arranged in the unit 300.

One embodiment of the clock function 352 and the subunits 351 is to utilize a counter/timer in a suitable CPU and allowing a detection in F4 trigger a reading off of the counter/timer 352 to capture register 351. The clocks are, in other respects, intended to define system times and can be read off by applications that are executing in the units, in contrast to the clocks that are hidden from the applications such as are often used in certain time-controlled communication protocols. An extremely advantageous facility that the disclosure provides is that clocks can be made as accurate as their applications require, without forcing other clocks in the system to be equally accurate.

An advantageous accuracy can be obtained if the first units' times are translated directly to each other instead of carrying out the translation via one or more first functions F1. More precisely, it can be said that negative effects originating from, for example, reading off errors and jitter in system components' electronics and logic can be limited. If, however, it is desired to have all events in the system on a common time axis or basis, for example for analysis, it is advantageous to utilize a first function F1 and plot the events concerned along the time axis that F1 describes. A fifth function F5, shown in FIGS. 1 and 3, includes a coordinator function which receives and sends reference timestamps to a unit that requesting the timestamps concerned, or to all the units that operate with function F2. The fifth function F5 suitably determines, with or without guidance from one or more second functions F2, which unit or units are to operate as or have the role of F1. The second functions in the system or the systems should, in addition, be able to calculate and send/associate translation accuracy/inaccuracy and/or stability/instability of the times/clocks/translations. This is in order not to need to assume that the worst case always applies, but instead to be able to utilize current assumptions.

Figure 5:
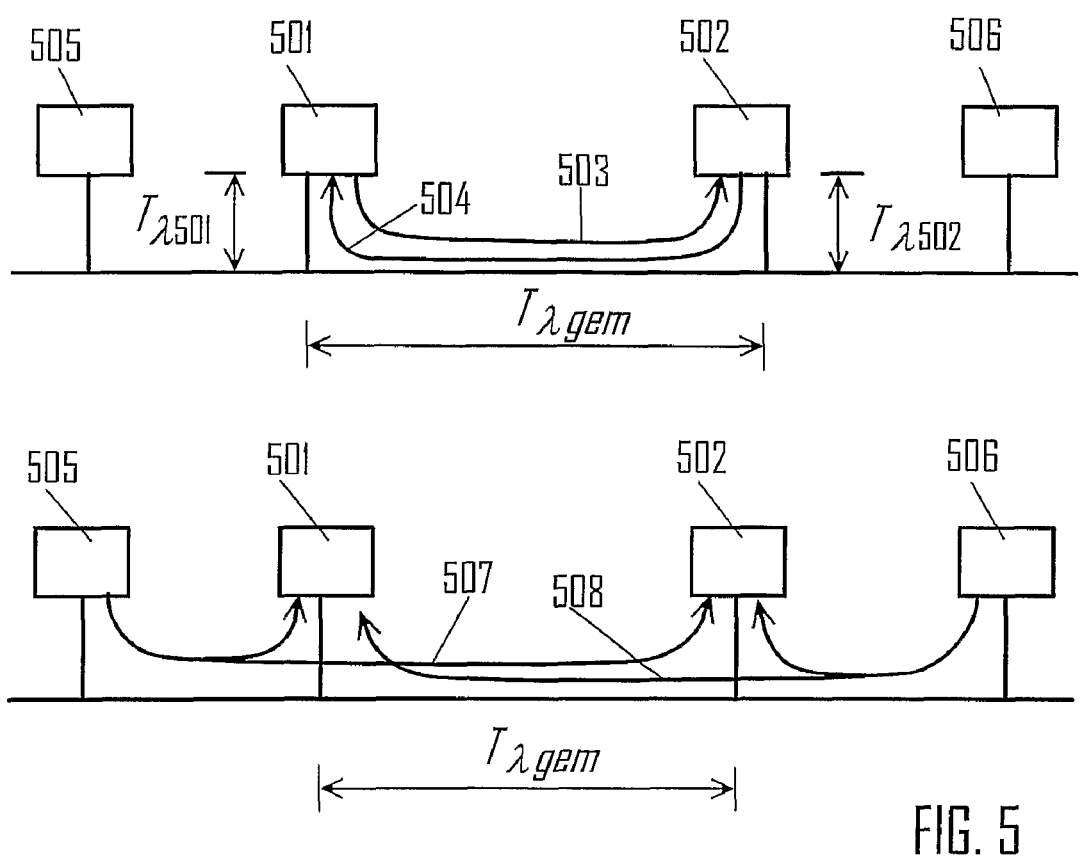
FIG. 5 shows two possible ways of measuring delays between units.

In the most general case, the units do not need to know the originator of a specific reference function execution. If the units, however, are arranged to be able to measure any delay over the serial communication between two units, they may, however, be provided with this facility. The delay can, for example, be determined with knowledge of a number of occurrences of reference function executions that propagate in both directions relative to the units between which the delay is to be determined. FIG. 5 shows examples of how this can be carried out.

Figure 6:
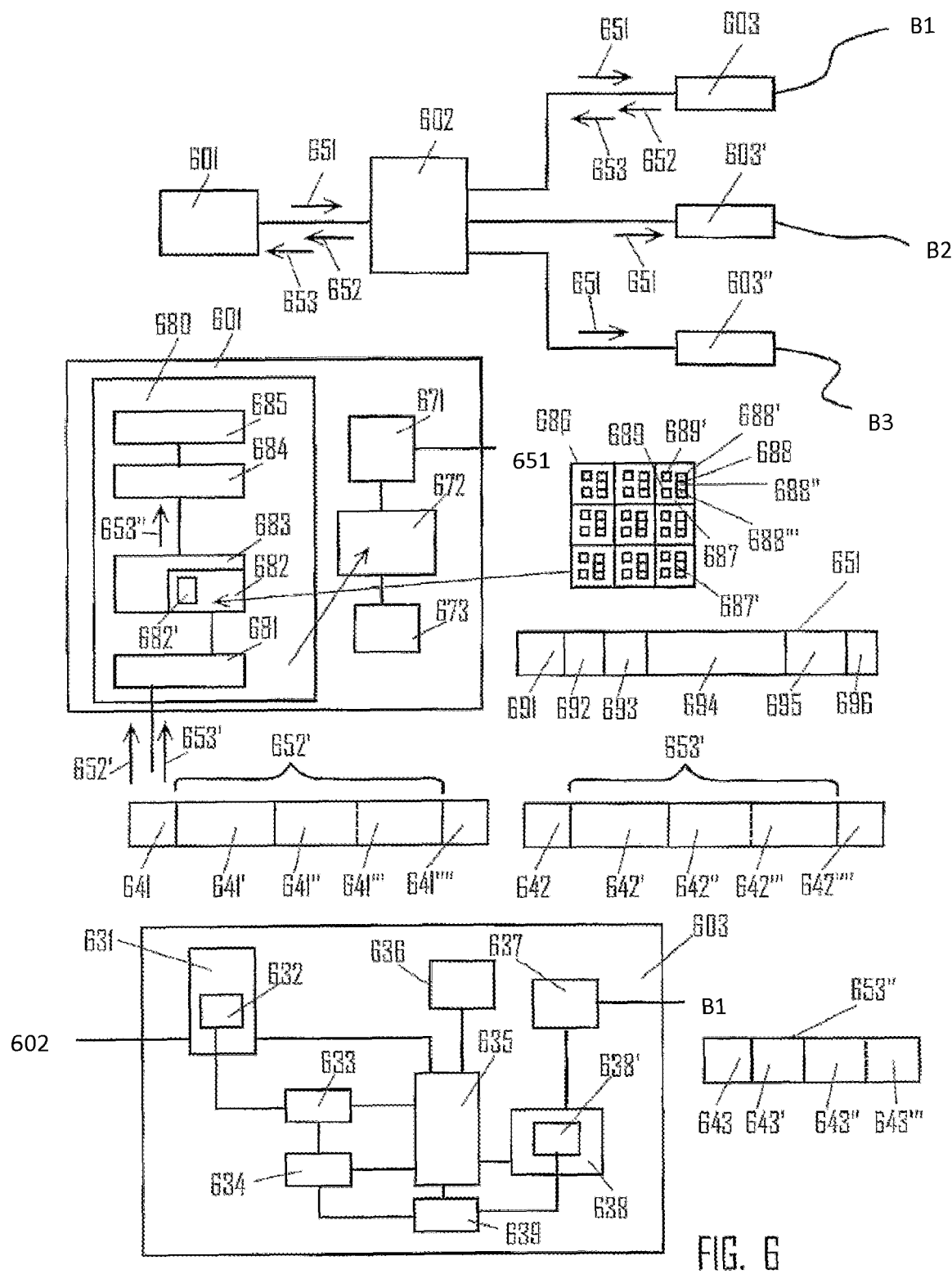
FIG. 6 shows how the USB protocol's SOF packets can be utilized for time relating in a system with a computer, for example a PC, and a number of units connected to this.

If unit 102 is, for example, a computer of the PC type with an operating system such as, for example, WINDOWS XP, the functions F1, F2 and/or F5 may be able to be implemented in the software that communicates with the OS's interface to the communication channel. The advantage of this is that PC computers are very common today and often are already used in many planned target systems and, in addition, usually have resources that can advantageously be utilized. Depending upon the implementation method and system requirements, great care must be taken so that calculations are carried out with sufficiently short response times, irrespective of what the OS is otherwise engaged in. This embodiment can provide a simple, flexible and accordingly cost-effective way of, for example, connecting a computer by means of the hardware to several CAN systems for analysis and/or interaction and, at the same time, provide a competent way of relating time within and/or between the systems. FIG. 6 shows examples of how this can be carried out.

Figure 4:
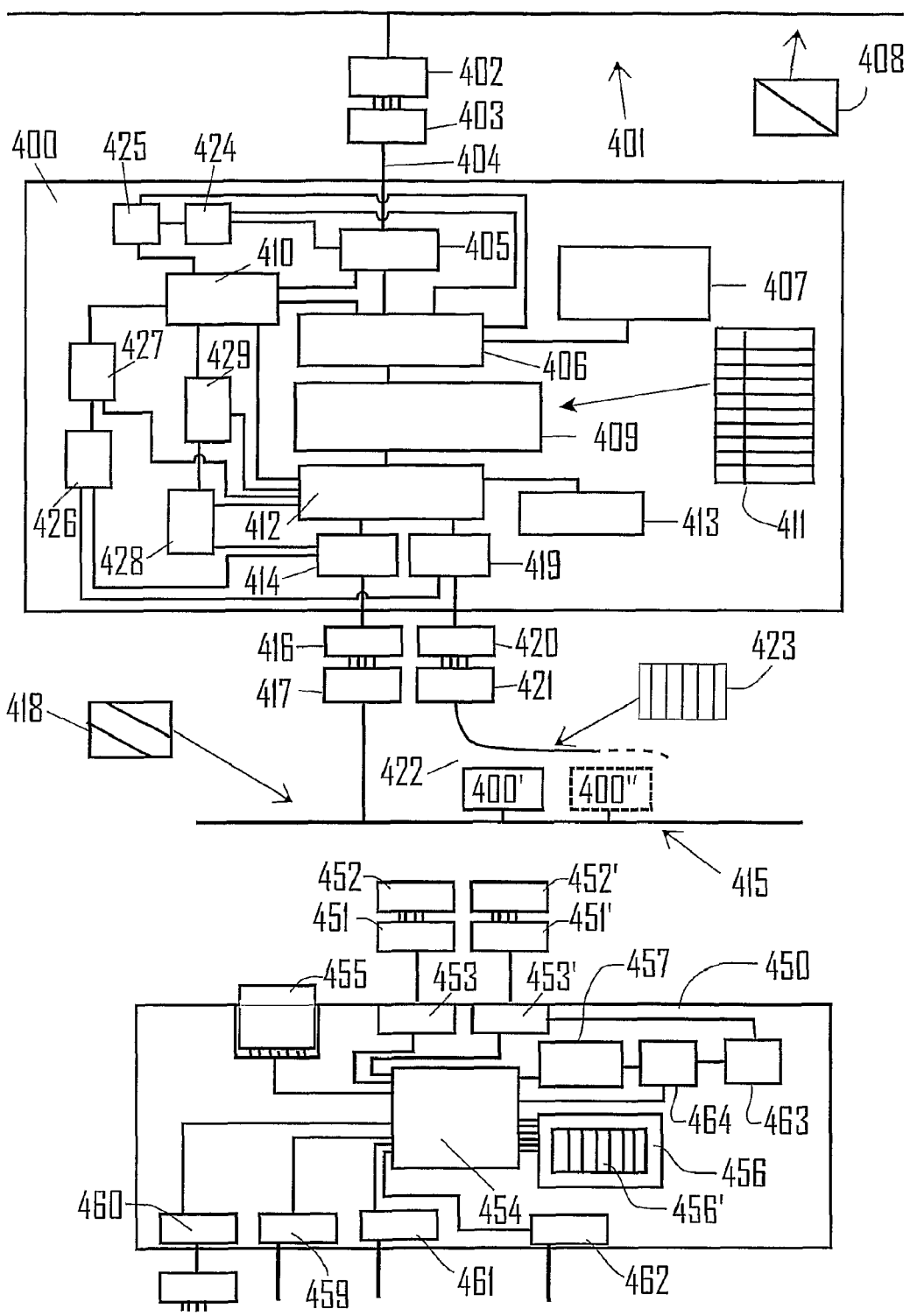
FIG. 4 shows a schematic illustration of a first unit 104 comprised in FIG. 1.

FIG. 4 shows in greater detail than in FIG. 3 a schematic construction of a unit 104 according to FIG. 1, here designated 400. For the sake of clarity, it is provided with two microprocessors, but the task can be carried out by one microprocessor. The unit 400 is connected on one side to a system 401 via the connectors 402, 403 and the connection cable 404. Via the interface electronics 405, the signals on the bus can be read by the microprocessor 406. Using instructions stored in the memory 407, the signals can be interpreted in accordance with the protocol 408 used in the system. In its simplest form, the interpretation can mean that only the received bit pattern is transferred, but the interpretation can be of a more complex type where much supplementary information provided by the protocol's rules is added by the microprocessor. Application software, that is instructions for one or more applications that process information available to the microprocessor, is also stored in the memory 407. The information thus interpreted is transferred to the dual-ported memory 409. Additional information of interest can be added to the interpreted information, for example timestamping when the information was obtained from the system. The time is obtained from the clock 410 which is triggered to be read off in a suitable way by the interface electronics 405, 414, 419 or alternatively by function execution detectors 424, 426, 428, for example when reception of a message commences. In order to make the reading off of the clock more independent of the processor 406, the event can be stored temporarily in capture registers 425, 427 and/or 429. The information is stored in the dual-ported memory in an organized way in accordance with rules depending on the system protocol's requirements, so that specific information is stored in a specific location indicated by the table 411. The dual-ported memory 409 can be read by the microprocessor 412 which can communicate, according to a second protocol, using rules stored in the memory 413, and physically via the interface electronics 414, with a second system 415 via the connectors 416 and 417. Rules are also stored in the memory 413 for how the information stored in 409 according to the rules in 407 and 411 is converted according to the rules for the second protocol 418. In simpler systems, the second protocol can be based on CAN and several units 400', 400'', etc., of the type 400. In the same way as described above, the unit 400 also contains rules for a third protocol with the interface unit 419 and connectors 420 and 421 which connect to the link 422 with the protocol 423. A suitable protocol can be based on USB.

In order to be able to synchronize a local clock 410 to an external time, for example, any F1, the processor should at least be able to set a new value in the clock. For the sake of simplicity and reliability, the interface between the clock and CPU should, however, allow the processor to, for example, ask the clock itself to compensate for a given offset and/or frequency error in a way that is acceptable to the unit and the system.

As the ability to get WINDOWS to carry out tasks in real time is greatly limited, it can be advantageous to let second unit 102 include a separate computer system with an OS better suited for the task. Such a computer system can be a unit or module 450 according to FIG. 4 with a microprocessor and peripherals specially adapted to handle communication and calculation problems. A number of modules such as unit or module 400 can be connected to the unit 450 via a suitable connection, for example a USB connection. Such an arrangement has many advantages. The analog and strictly real-time problems are solved by the module 400, while the calculation-intensive and less real-time-critical tasks are handled by the unit 450. The module 450 is connected directly to one or more modules 400 by connectors that are illustrated by 451, 452, 451', 452', etc. Communication circuits 453, 453' are connected to a microprocessor 454 with associated peripherals, among other things memory or memories. These memories contain applications software, that is instructions for one or more applications that process information available to the microprocessor. A memory card 455 is arranged for log equipment, recording and playback capability, etc. A memory 456 connected to the microprocessor can be written to and read from in two (both) directions, that is from both the system side and the tool side. The memory can be divided into a number of subsidiary memories with different algorithms 456'. The clock 457 can be synchronized with or related to the clock in the first unit 410 via the protocol in the abovementioned way. To assist with this, there can be a function execution detector 463 and capture register 464 arranged in a similar way to components in the unit 400.

In this way, all first units 104 connected to a second unit 102 can be time synchronized or time related. In the same way, second units 102 should be able to relate time between themselves. Through time synchronization of the different units, the execution of the applications in the different units can be synchronized or related to each other. Execution of applications or parts of applications that are responsible for measuring can, in this way, be coordinated with execution of applications or parts of applications that are responsible for communication within and between the different units. This means, among other things, that messages sent according to an event-controlled protocol, for example CAN, can appear in a time-controlled way, as applications for the transmission of messages are executed and coordinated in time.

As a result of the execution of applications for measurements being coordinated with the transmission of measurement results, a time relationship is obtained between the measurement and the distribution of the measurement results in the system in the form of messages. The same can, of course, be carried out for indicated events and messages with information about the respective events. Together with the unit 400 and also with suitable software, the unit 450 can simulate completely or partially an ECU in an ordinary CAN system in a vehicle. The unit 450 can be equipped with means for communication with other network protocols, for example Bluetooth 459 and TCP/IP 460 for communication between a network of units 450 and/or tool units implemented in a PC or PDA. As an alternative to storage disks so-called "USB mass storage devices" can be connected to a USB connection. For communication over a telecommunications network, the unit can be equipped with a GSM module 461 and for time synchronization or clock synchronization with a GPS module 462 which can also be utilized for position determination. See above, regarding the protocols.

Irrespective of whether the unit 102 includes a normal PC or a unit such as 450, it can advantageously carry out the function F3, in particular if the selected protocol is USB and the unit is a USB host, which means that the unit generates SOF packets. As mentioned above, these are suited for carrying out reference function executions.

FIG. 5 shows the measuring of communication delays between units, where the units 501 and 502 can be of the type, for example, such as unit 400. In the first case, unit 501 sends a message 503 to unit 502 and both timestamp the message with their local clock. We can call 501's timestamp of 503 Tref13, and 502's timestamp of 503 Tref23. Thereafter, 502 sends a message 504 to 501 which is timestamped by the two units. 501's timestamp of 504 can be called $T_{ref14}$ and 502's timestamp of the same can be called $T_{ref24}$. If, for example, 502 thereafter sends $T_{ref23}$ and $Tre_{ref24}$ to unit 501, 501 can determine the communication delay, $T_\lambda = T_{\lambda 501} + T_{\lambda gem} + T_{\lambda 502}$, between 501 and 502, for example using the following method:

$$\begin{cases} T_\lambda = T_{\lambda 501} + T_{\lambda gem} + T_{\lambda 502} \\ T_{\lambda gem} = (T_{ref23} - T_{ref13}) - (T_{ref14} - T_{ref24}) \end{cases}$$

where $T_{\lambda 501}$ and $T_{\lambda 502}$ represent the delay from the units 501, 502 to their respective connection point to the communication channel. The "gem" portion of the subscript is derived from the Swedish word for "common" i.e. "gemensam".

An additional variant of the determining of delays is also the one shown in FIG. 5. Instead, a unit 505 sends a message 507 which, in accordance with the figure, first reaches 501's connection point in the communication channel and then 502's connection point, and 501 timestamps the message as $T_{ref17}$ and 502 as $T_{ref27}$. Thereafter, unit 506 sends a message 508 that propagates through the communication channel in the opposite direction. This time, the message reaches 502's connection point first and thereafter 501's connection point. 502 timestamps it as $T_{ref28}$ and 501 as $T_{ref18}$. The delay in the shared part of the communication channel $T_{\lambda gem}$ can then be determined according to:

$$T_{\lambda gem} = (T_{ref27} - T_{ref17}) - (T_{ref18} - T_{ref28})$$

Both these simple variants of delay determination assume that the Trefs utilize time tick of the same size and that any frequency deviation between the units 501 and 502 can be made negligible or can be compensated for by any of the methods.

FIG. 6 shows an embodiment of how the USB protocol's SOF packet can be utilized for time relating in accordance with the disclosure. The system comprises a number of units 603, 603', 603" which can be of the type, for example 104 or 400. These are connected via one or more USB hubs 602 (for example of type 103 or 200) to a computer 601, for example a PC, which can also be of the type, for example 102. 601 transmits SOF packets 651 as it should in accordance with the USB protocol at regular intervals. This can constitute an example of the previously mentioned function F3, that is the reference function execution generator or reference event generator.

A Start-Of-Frame packet, SOF, contains typically a Start-Of-Packet/Sync field 691, an identification field 692, the identification field inverted 693, frame number 694, CRC field 695 and finally an End-Of-Packet field 696.

The unit 603 contains a USB controller 631 which in turn contains a device 632 designed to detect SOF packets 651. The detections in 632 are arranged to trigger a reading of clock 634 to a capture register 633. The time stored in this way is hereafter called Tref. Both the clock 634 and the capture register 633 can be read by the microprocessor 635. Both 633 and 634 should advantageously be able to be incorporated in 635. Program code is stored in the memory 636 which, for example, is run each time 635 receives an SOF packet from 631. The program can, for example, read off the frame number on the SOF packet and, depending upon the requirements and conditions always or at certain intervals read out Tref from 633 and send a new USB packet 652 using 631 via 602 to 601. 603 also contains interface electronics 637 for a CAN controller 638 which, in turn, contains a precise detection mechanism 638' for detecting when the CAN messages commence.

The detection mechanism 638' also triggers the capture register 639 which then reads clock 634. The timestamp which is to be found in capture register 639 can be sent, together with the message that triggered the reading in a packet 653 to 601. The packet type 653' can, for example, include USB overhead, 642 and 642"", data, 642', from the CAN controller 638, a timestamp, 642", of when the data 642' was received by 638, and if required more data with associated timestamps, 642'". The packet type 652' contains, in addition to the overhead, 641, 641"", that USB adds, a Tref, 641', the sequence number of the SOF that gave rise to the Tref, 641", and, if required, more Trefs with associated sequence numbers and/or other data, 641'".

Computer or processor 601 is arranged with a USB host 671. As already mentioned, 671 sends SOF packets 651 at regular intervals in accordance with the USB protocol. When the computer receives packets of the type 652 from its connected units 603, 603', etc, via the USB host 671, these can be read and processed by the processor 672 using program code in the memory 673. Among other things, program code according to the logical data flow chart in 680 is run in the processor. Unit 681 represents here the USB drive routines that constitute a part of the operating system that processor 601 utilizes. These contain, among other things, checks on the physical structure of the USB system, and read out the data packets from the controller 671. If these packets originate from any of the units 603, 603', etc, they are forwarded via the time-handling functions 682 to the drive routines 683 intended for the purpose. If the messages are packets of the type 652, the information 652' is retrieved from them, that is the so-called Trefs 641', also the sequence numbers 641" and any other data 641'", and they are taken charge of by the time-handling functions 682 which are a part of 683.

The system is, after all, also intended to be used and it is represented here by a user application 685 which logically communicates directly with the units 603, etc, but in practice this is carried out via the commonly used interface 684 which provides all the functions that a user can utilize in the units. The interface 684 thus connects together the program 685 with units' drive routines 683. The interface displays, for example, if so required, all timestamps from the different units along one and the same time axis, which is carried out using the time-handling functions 682 completely in the spirit of the disclosure. In the figure, this is exemplified by the message 653 sent from a unit 603 to 601. Unit 671 decodes the packet and forwards the content 653' to the processor 672 for further processing. For example, unit 681 sees that the message originates from a unit of type 603 and forwards it to the drive routines 683 intended for the purpose. The time-handling functions 682 in 683 see that the message contains a timestamp 642" in a local unit's time, and so it translates this to a suitable time according to, for example, the following procedure. The translated time, 643', and any calculated inaccuracy 643", are displayed together with data, 643, (that is 642' possibly further processed by 683) and any other information 643'", taken as a whole 653", to the application 685 via the interface 684.

The time-handling functions 682 can be divided into a part that saves and handles a history 682' of Trefs with sequence numbers that come from the packets 652' and information about the originating unit and keep translation functions updated and a second part that carries out the actual translations. In order to be able to carry out direct translation between the times of all units, a type of logical translation matrix 686 can be utilized. For each pair of units 687, 687', etc, whose time is to be able to be translated directly, there is a list 688 with most recently matched pairs of Trefs 688', 688", etc. These Trefs 688', etc, can then be utilized to carry out a translation between the times of the comprised units, for example according to:

$$B_x = B_{new} + (B_{new} - B_{old}) * (A_x - A_{new})/(A_{new} - A_{old}) \text{ or}$$

$$B_x = B_{new} - (A_x - A_{new}) + (((B_{new} - A_{new}) - (B_{old} - A_{old})) * (A_x - A_{new}))/(A_{new} - A_{old}).$$

where $A_x$ is to be translated to $B_x$ using the matched Tref pairs $(A_{new}, B_{new})$ and $(A_{old}, B_{old})$ which can thus correspond to 688' and 688'". As can be seen, there is a part of the calculations that can be carried out in advance, for example $(B_{new} - B_{old})$ and $(A_{new} - A_{old})$ in first alternative and $(B_{new} - A_{new})$ and $(B_{old} - A_{old})$, etc, in second alternative. Such calculations can, as stated, advantageously be performed in advance and saved in a location 689 designed for the purpose in order to simplify and thereby speed up future translations. Statistical inaccuracy concerned can also be calculated and saved in a location 689' designed for the purpose. It is, of course, possible to make an extremely complex and exhaustive estimate of any inaccuracy on the basis of the whole history of matched Tref pairs, but in order to give a simple illustrative example, one of the Trefs in a pair 688' can, for example, be translated using two other pairs in the list 688. The translated Tref is then compared with the actual Tref in the pair. The difference between them can be regarded as a simple measurement of inaccuracy/non-linearity.

Another variant of the translation matrix can be to let a row or column represent a virtual time, on the basis, for example, of some weighting of suitable other times.

A simpler variant of the translation matrix is the special case when only one or a few rows or columns in the matrix are kept updated in the way mentioned above. As each row or column can give information about how relating can be carried out from and to a particular time, this time can be utilized as a kind of intermediate master time in translation between two other times. This can be a less memory- and/or resource-intensive alternative to keeping the whole matrix updated at a cost of slightly more complicated translations and/or possibly greater inaccuracy. The intermediate master time here can constitute examples of the function F1.

The time-handling or translation function F2/682 can be broken down into a number of elements that, however, do not all necessarily need to be carried out in each unit arranged with the function. Certain elements can be carried out by one unit that then sends the information to another unit that then does not need to carry out the element. Examples of element functions include:
- collecting and keeping track of time-stamped reference function executions for each time that is to be able to be translated.
- finding, from among the collected timestamps, timestamps from different units of the same reference function execution.
- determining, on the basis of these matched timestamps, how any translation is to be carried out depending upon given conditions.
- determining, on the basis of timestamps, how stable/accurate a particular time can be considered to be, for example using statistics.
- demanding, if a time is considered to be unstable/inaccurate, more frequent timestamped reference function executions from the system.
- carrying out translations when so requested.

The time-handling functions can be considered to be an example of the translation function F2.

In the systems, S1 can thus, for example, work with local translation of time, S2 with centralized translation and S3 with local synchronization. Of course, it is also possible to combine different variants in one and the same system.

The event recognitions are to be arranged or are to form the basis for or invoke functionality in the system, such as, for example, analysis. Items of such functionality are represented in FIG. 1 by F6 and F7.

Figure 7:
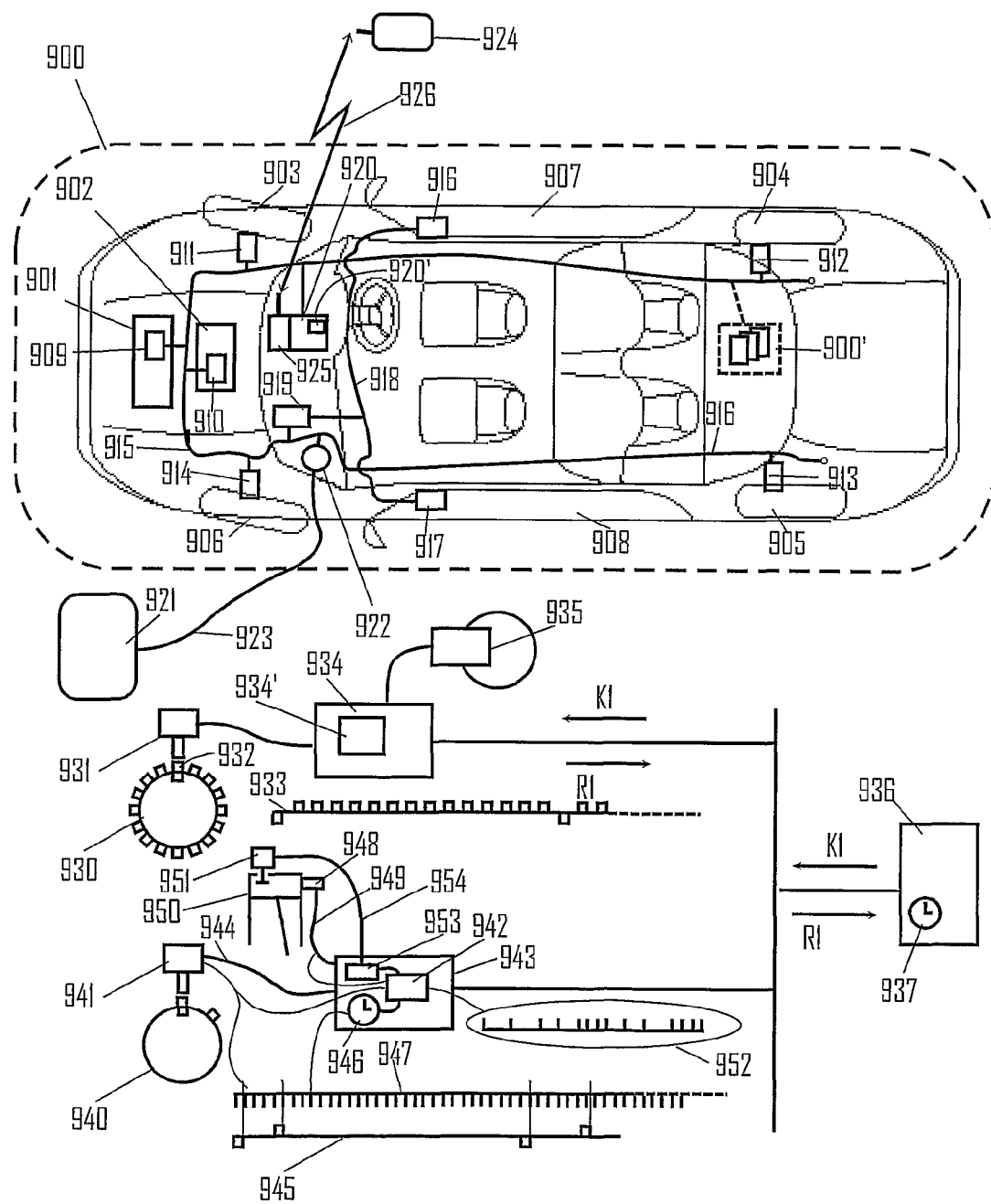
FIG. 7 shows a traffic system in which the cars utilize local independent time domains that are coordinated with a traffic monitoring system with centrally coordinated, flexible time domains.

FIG. 7 shows a simplified car system 900 that includes a number of event-generating subsystems that are exemplified by a motor 901, a gearbox 902, four wheels 903, 904, 905 and 906 and the doors 907 and 908. Other Electronic Controller Units (ECU) that are required for the car's functions are symbolized by 900'. Each event-generating subsystem has an event-generating and event-detecting ECU. The motor ECU 909, gearbox ECU 910 and the wheel ECUs 911, 912, 913 and 914 are connected to the CAN network 915. The door ECUs 916 and 917 are connected to the LIN network 918. The LIN master 919 is connected to both the LIN network 918 and the CAN network 915. A system-controlling and monitoring unit or system module 920 is also connected to the CAN network. External units such as diagnostics instruments, programming devices, analysis instruments, etc., represented by 921, can be connected to the system via the connector 922 and a connection cable 923. Contact with external units 924 can also be carried out via the radio unit 925 and the radio link 926 in the monitoring unit 920. In a first stage, the monitoring unit 920 controls all the other modules in a first time domain where no time is transferred before a wake-up event is transmitted over the CAN bus. In this mode, the system's energy consumption is very low. The monitoring unit itself is in another low-consumption time domain where a time tick event is generated by an internal clock 920', for example 10 times per second. This event initiates listening for incoming signals from an external unit 924, for example a signal concerning opening of doors. If such a signal is detected, the monitoring unit sends a wake-up signal over the CAN bus and all the ECUs change to a respective local time domain which is suitable for CAN and LIN communication and for internal event detection and event generating. A command concerning opening doors is given to the unit 919, which in turn commands the units 916 and 917 to open the doors.

The ECUs controlling rotating parts establish their own time domains on the basis of the speed of rotation. In its simplest form, time base events are generated by pulse-generating wheels 930 and a pulse-detecting device 931. In this example, a pulse is generated with inverted sign by a sensor 932. The device 931 detects the pulse train 933 which is forwarded to the ECU 934 which thereby creates a clock function 934' with a circular time base with a time tick that corresponds to a rotation of 22.5 degrees. Time is thus measured locally in past wheel angle units. If the wheel stops, then the local time stops. The ECU 934 can control the brakes 935. The time base varies with the speed of rotation of the wheel compared to a time base based on the physical second. A controlling unit 936 with a time base 937 based on the physical second can give commands K1 to and receive reports R1 from the unit 934. By means of status reports from the four wheels, the unit 936 can determine how the wheels are moving relative to each other and command them to increase or decrease the braking force while turning. If a wheel locks, then the time there will stop and reporting will cease. This situation is easily detected by the unit 936, partly by the other wheels reporting, and partly as a result of an expected report in relation to the internal time domain not having arrived.

More complicated time domains can be constructed when expedient. The event generator 940 generates two pulses per revolution with inverted sign and 45 degrees interval. These are detected by the detector unit 941 and transferred to the local translator or counter 942 in the ECU 943 via the link 944. The generated time domain is shown as 945. The ECU 943 has an internal clock 946 which generates the time domain 947. There is a pressure sensor 948 in the system which gives pressure information in discrete steps to the unit 943 via the link 949, where each step can be regarded as an event. Passage of certain of these events can be utilized in order to generate a time tick. The pressure sensor is connected to a cylinder 950 in the motor 901. The ECU 943 controls the electrical valve arrangement 951. The local translator 942 compiles the information from the time domains 945 and 947 and 948 into a new time domain 952 that is suitable for valve control. The control unit 953 gives control commands to the valve control mechanism 951 via the link 954 in the time of the time domain 952. The local translator 942 thereby obtains a clock function viewed from the unit 953. In this way, a "virtual camshaft" can be created, where the characteristics of the control algorithm are changed by the time domain 952 being changed in accordance with variations in speed of revolution and pressure.

A unit 921 can be connected to the system for analysis or diagnostics. The various nodes can have stored in their memories a translation algorithm that states how their respective time domains are transformed to a linear time domain based on the physical second. The instrument 921 can request that the respective modules transmit the translation algorithms. This assumes that the utilized HLP (Higher Layer Protocol) supports such a procedure. Otherwise, the algorithms are to be found in the system's documentation. Alternatively, the algorithms are stored in the system module 920.

Figure 8:
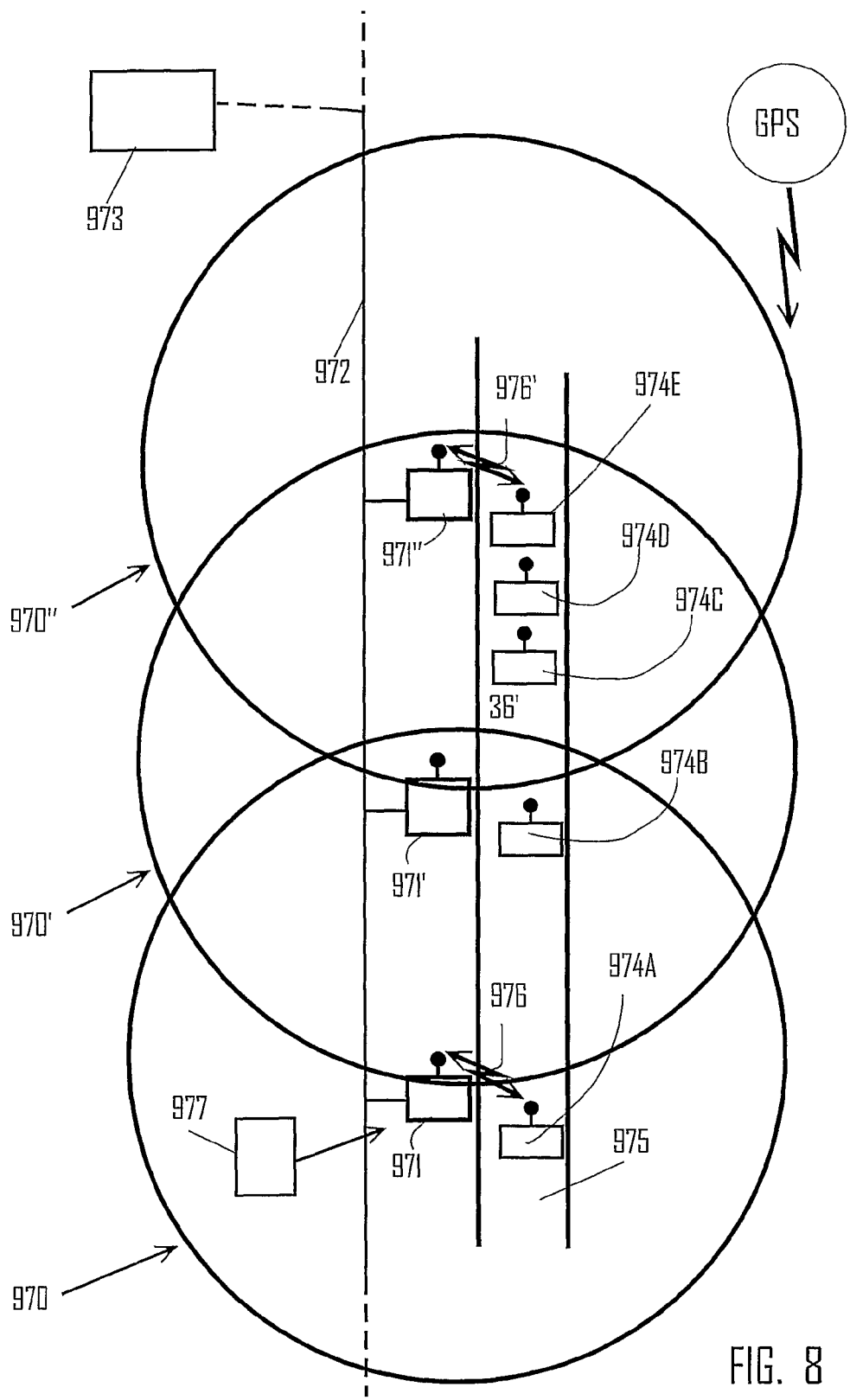
FIG. 8 shows schematically a traffic monitoring system.

FIG. 8 shows a schematic traffic-monitoring system. Traffic control and traffic monitoring are an increasing problem in society. Increasing numbers of cars are equipped with GPS and GSM in order to make things easier for the car's driver. This development is taking place largely independently of the social problem. A simple solution to the problem is to standardize a fixed local time domain for all cars and for the monitoring system to work with time domains that vary geographically and according to requirements. The cars are obliged to be equipped with GPS receivers and transmitters linked to a communication network determined by society and to use these to report their position periodically, for example every ten seconds. If a collision occurs, this is reported immediately, with information from relevant collision-related sensors. The road network is covered by communication cells 970, 970', 970'', etc, of a suitable size. Each cell is served by a base station 971, 971', 971'', etc., connected to a cable-based (optical or copper) network 972. The control and monitoring system is also connected to this, symbolized by 973. A number of cars 974, 974A, 974B, 974C, 974D, 974E are driving along the road 975. Every ten seconds, they transmit their position according to GPS exemplified by 976, 976'. In addition to position, additional information can be sent, for example speed, estimated damage in the event of a collision, number of passengers, etc., as an anonymous or identified transmitter depending upon legislation. Each base station carries out a first processing and compiling of data, for example the number of passing cars per minute, accidents that have occurred, exceeding of speed limits, etc., and compiles this in a report 977. Each base station is allocated at least two local time domains by the unit 973, for example a circular time domain with transit time of 1 minute and a linear limited time domain, with a start time upon a particular type of message being received from the cars, for example collision messages that extend up to and include a transmitted report to the unit 973. In this way, the utilization of the road communication network is optimized. The traffic information arrives regularly once per minute over the link 973, dispersed in time as the local time domains are not synchronized with each other. In the event of a collision, reporting is carried out immediately and can thereby be dealt with quickly. The transmitted message from the damaged car becomes a reference event between the system cars and the monitoring system. 973 can, as required, change time domains, and the bandwidth of network 972 can be made available for other information, for example commercial communication. The cars' time domains do not need to be related to the time domain of the monitoring system. It can easily be seen that the concept of the disclosure can be varied in many ways for controlling and changing characteristics and relationships of systems to those of other systems so that they will work together.

The disclosure is not limited to the embodiments described above as examples, but can be modified within the framework of the following claims and the concept of the disclosure.

What is claimed is:

1. A method comprising:
   timestamping a reference event with a reference time determined with respect to a first clock operating in a first time base used by a first interconnected unit, the first clock receives a time tick generated in response to movement of a part in a machine;
   providing the reference time to a second interconnected unit;
   determining a method of correlation between the reference time in the first time base and a reference time in a second time base, the method of correlation being selected from a set of at least two methods of correlation and being selected dependent on at least one of a linearity of the two time bases or a similarity of size of time ticks of between the first time base and the second time base; and
   using the correlation to translate a time measured by the first clock to a time in a different time base during run time.

2. The method of claim 1 further comprising:
   receiving a message at the first interconnected unit from the second interconnected unit; and
   accounting for delays within the first and second interconnected units and for a propagation delay between the first and second interconnected units based on the received message.

3. The method of claim 1, wherein said reference event comprises a start of frame (SOF) indication.

4. The method of claim 3, wherein said reference event comprises a SOF packet in a universal serial bus (USB) protocol message.

5. The method of claim 3, wherein said reference event comprises a SOF bit in a controller area network (CAN) protocol message.

6. The method of claim 1, further comprising generating the reference event.

7. The method of claim 1, further comprising:
   receiving a global time at the first interconnected unit; and
   correlating a time determined with respect to the first clock with the global time.

8. The method of claim 1, wherein the time tick is generated in response to rotation of a shaft.

9. The method of claim 8, wherein the time tick is generated in response to rotation of a main shaft of a motor.

10. The method of claim 1, wherein the reference event is generated in response to the movement of a vehicle.

11. A method comprising:
    times tamping a first reference event with a first reference time determined with respect to a first clock used by a first interconnected unit;
    timestamping a second reference event with a second reference time determined with respect to the first clock;
    providing the first reference event comprising the first reference time to a second interconnected unit;
    providing the second reference event comprising the second reference time to the second interconnected unit;
    the second interconnected unit timestamping the first reference event with a third reference time in response to receiving the first reference event;
    the second interconnected unit timestamping the second reference event with a fourth reference time in response to receiving the second reference event;

wherein the third reference time and the fourth reference time are determined with respect to a second clock used by the second interconnected unit and having a different accuracy than the first clock;

determining during run time at least a first difference between the first reference time and the third reference time and a second difference between the second reference time and the fourth reference time; and using at least the first and second differences to translate during run time a time measured by at least one of the first clock or the second clock to a time in a different time base from the time to be translated during run time.

12. The method of claim 11, further comprising correlating a time determined with respect to the first clock to a GPS time.

13. The method of claim 11, wherein the first reference event and the second reference event each comprises receiving a bit pattern at the first interconnected unit.

14. The method of claim 13, wherein the first interconnected unit receives the bit pattern in a message from a controller area network (CAN) interface.

15. The method of claim 14, wherein the bit pattern follows an arbitration field.

16. The method of claim 14, wherein the bit pattern is a start of frame (SOF) bit in a CAN protocol message.

17. The method of claim 13, wherein the first interconnected unit receives the bit pattern in a message from a universal serial bus (USB), and wherein the bit pattern is a start of frame (SOF) packet in a USB protocol message.

18. The method of claim 11, further comprising detecting the first reference event and the second reference event.

19. The method of claim 11, further comprising generating the first reference event and the second reference event.

20. A system comprising:
a first unit configured to detect a reference event in a first of a plurality of interconnected units;
a first clock configured to determine a first reference time of the detected reference event measured in a first time base;
a first message unit configured to send a first message including the first reference time to a second of the plurality of interconnected units, wherein the second of the plurality of interconnected units uses a second time base based at least in part on a second clock, wherein the first clock and the second clock have different accuracies;
a translation device configured to:
correlate time measurements between the first time base and the second time base during run time using at least one form of translating from a set comprising at least two forms of translating; and
select the form of translating based on, at least in part, a determination of at least one of a linearity of the first and second time bases or a similarity of size of ticks of the first and second time bases, wherein the determination utilizes at least two sets of past reference times, individual sets of past reference times comprising one time in the first time base and a correlated time in the second time base.

21. The system of claim 20, further comprising a generating unit configured to generate the reference event.

22. The system of claim 20, wherein the translation device is configured to account for delays within an interconnected unit.

23. The system of claim 20, wherein the translation device is configured to account for a communication path delay between interconnected units.

24. The system of claim 20, wherein the reference event comprises a start of frame (SOF) indication.

25. The system of claim 24, wherein the start of frame (SOF) indication is a SOF packet in a universal serial bus (USB) protocol message.

26. The system of claim 24, wherein the start of frame (SOF) indication comprises the SOF bit in a controller area network (CAN) protocol message.

27. The system of claim 20, wherein the reference event comprises a bit pattern in a controller area network (CAN) protocol message.

28. The system of claim 20, wherein the translation device is configured to determine a common time base that creates time indications that are directly comparable with each other within and between one or more of the plurality of interconnected units.

29. The system of claim 20, wherein the reference event comprises a bit pattern suitable for detection by one or more interconnected units.

30. The system of claim 20, wherein the first unit comprises a processing device configured for communication with one or more units via a serial communication link.

31. The system of claim 30, wherein the processing device operates with a general-purpose operating system, wherein a time translation accomplished by the translation device is implemented by drive routines.

32. The system of claim 30, further comprising a second message unit connected by a universal serial bus (USB) communication link through a USB host to the first message unit.

33. The system of claim 20, wherein the reference event is generated by movement of a vehicle.

34. A system comprising:
a first unit configured to detect a reference event in a first of a plurality of interconnected units, wherein the reference event comprises a bit pattern in a CAN protocol message, and wherein the bit pattern follows an arbitration field;
a first clock configured to determine a first reference time of the reference event measured in a first time base;
a first message unit configured to send a first message including the first reference time to a second of the plurality of interconnected units via a communication channel between the first and the second interconnected units, at least a portion of which comprises a shared potion of the communication channel, wherein the second of the plurality of interconnected units uses a second time base based on a second clock;
a second message unit configured to receive the first message and to timestamp the first message with a time of receipt and send a second message containing a second reference time to the first message unit; and
a translation device configured to determine a communication propagation delay in the shared portion of the communication channel between the first and the second units by using at least the first reference time, the second reference time, and the time of receipt of the first message by the second message unit.

35. The system of claim 34, further comprising a GPS interface configured to correlate a first unit time measured by the first clock to a GPS time.

36. The system of claim 34, wherein the translation device is configured to determine the communication propagation delay in the shared portion of the communication channel between the first and the second units by using a time of receipt of the second message by the first message unit.

37. The system of claim 36 wherein the translation device is configured to
- determine a first difference between the first reference time and the time of receipt of the first message by the second message unit;
- determine a second difference between the second reference time and the time of receipt of the second message by the first message unit;
- determine the communication propagation delay in the shared portion of the communication channel between the first and the second units by determining a difference between the first difference and the second difference.

38. The system of claim 37 wherein the first clock and the second clock utilize a time tick of approximately the same size and have a negligible frequency deviation.

39. The system of claim 34, further comprising an interface unit configured to receive a global time base, wherein the interface unit is configured to correlate the first time base to the global time base.

40. A system comprising:
- a first unit configured to detect a reference event in a first one of a plurality of interconnected units;
- a first clock configured to determine a first reference time of the detected reference event measured in a first time base, wherein the first clock comprises a time tick generator configured to generate time ticks responsive to movement of a part in a machine;
- a first message unit configured to send a first message including the first reference time to a second one of the plurality of interconnected units, wherein the second one of the plurality of interconnected units uses a second time base; and
- a translation device configured to:
  - correlate time measurements between the first time base and the second time base during run time using at least one form of translating from a set consisting of at least two forms of translating; and
  - select the form of translating based on, at least in part, a determination of at least one of a linearity of the first and second time bases or a similarity of size of time ticks of the first and second time bases, wherein the determination utilizes at least two sets of past reference times, individual sets of past reference times comprising one time in the first time base and a correlated time in the second time base.

41. The system of claim 40, wherein the time tick generator is configured to generate time ticks in response to a rotation of a revolving shaft.

42. The system of claim 41, wherein the revolving shaft comprises a main shaft of a motor.

43. A method comprising:
- timestamping a reference event with a reference time determined with respect to a first clock used by a first interconnected unit, wherein the reference event comprises a bit pattern in a CAN protocol message, and wherein the bit pattern follows an arbitration field;
- providing the reference time to a second interconnected unit;
- determining a method of correlation between the reference time in the first time base and a reference time in the second time base, the method of correlation being selected from a set of at least two methods of correlation and being selected dependent on at least one of a linearity of the two time bases or a similarity of size of time ticks of each time base; and
- using the method of correlation to translate a time measured by the first clock to a time in a different time base during run time.

44. The method of claim 43 further comprising:
- receiving a message at the first interconnected unit from the second interconnected unit; and
- accounting for delays within the first and second interconnected units and for a propagation delay between the first and second interconnected units based on the received message.

45. The method of claim 43, further comprising correlating a time determined with respect to the first clock to a GPS time.

46. A method comprising:
- maintaining at a computing device a database comprising at least a first set of correlated reference times and a second set of correlated reference times, wherein:
  - the first set of correlated reference times comprises at least a first reference time for a first reference event timestamped with respect to a first clock used by a first interconnected unit and another first reference time for the first reference event timestamped with respect to a second clock used by a second interconnected unit; and
  - the second set of correlated reference times comprises at least a second reference time for a second reference event timestamped with respect to the first clock and another second reference time for the second reference event timestamped with respect to the second clock;
- translating using a translation function a third reference time for a third reference event timestamped with respect to the first clock to a calculated third reference time for the third reference event comprising a calculated timestamp with respect to the second clock, wherein the translation function utilizes at least the first and second sets of correlated reference times;
- determining a difference between the calculated third reference time and an actual third reference time for the third reference event timestamped with respect to the second clock, wherein the difference represents a measurement of at least one of an inaccuracy of the translation function or a nonlinearity of at least one of the first or second clocks.

* * * * *

UNITED STATES PATENT AND TRADEMARK OFFICE
CERTIFICATE OF CORRECTION

PATENT NO. : 8,065,052 B2  
APPLICATION NO. : 11/554370  
DATED : November 22, 2011  
INVENTOR(S) : Fredriksson et al.

Page 1 of 1

It is certified that error appears in the above-identified patent and that said Letters Patent is hereby corrected as shown below:

Column 20, line 25, in Claim 2, delete "claim 1" and insert -- claim 1, --.

Column 20, line 53, in Claim 11, delete "times tamping" and insert -- timestamping --.

Column 22, line 47, in Claim 34, delete "potion" and insert -- portion --.

Column 23, line 1, in Claim 37, delete "claim 36" and insert -- claim 36, --.

Column 23, line 2, in Claim 37, delete "configured to" and insert -- configured to: --.

Column 23, line 14, in Claim 38, delete "claim 37" and insert -- claim 37, --.

Column 24, line 15, in Claim 44, delete "claim 43" and insert -- claim 43, --.

Signed and Sealed this  
Twenty-ninth Day of May, 2012

David J. Kappos  
*Director of the United States Patent and Trademark Office*